(12) United States Patent
Clement et al.

(10) Patent No.: US 10,940,719 B2
(45) Date of Patent: Mar. 9, 2021

(54) TIRE FOR HEAVY INDUSTRIAL VEHICLE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Emmanuel Clement, Clermont-Ferrand (FR); Alain Domingo, Clermont-Ferrand (FR); Olivier Sejalon, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 762 days.

(21) Appl. No.: 15/304,933

(22) PCT Filed: Apr. 22, 2015

(86) PCT No.: PCT/EP2015/058712
§ 371 (c)(1),
(2) Date: Oct. 18, 2016

(87) PCT Pub. No.: WO2015/162174
PCT Pub. Date: Oct. 29, 2015

(65) Prior Publication Data
US 2017/0182846 A1    Jun. 29, 2017

(30) Foreign Application Priority Data

Apr. 22, 2014   (FR) .................................... 1453592

(51) Int. Cl.
*B60C 9/20*       (2006.01)
*B60C 9/00*       (2006.01)
*D07B 1/06*       (2006.01)

(52) U.S. Cl.
CPC .......... *B60C 9/2006* (2013.01); *B60C 9/0007* (2013.01); *B60C 9/20* (2013.01);
(Continued)

(58) Field of Classification Search
CPC ............................... B60C 9/20; D07B 1/0633
(Continued)

(56) References Cited

U.S. PATENT DOCUMENTS 5,318,643 A * 6/1994 Mizner .................. B32B 25/02
152/451
5,637,163 A * 6/1997 Kobayashi ................ B60C 9/20
152/526

(Continued)

FOREIGN PATENT DOCUMENTS

CN        201037216        *    3/2008
EP        0 383 716 A1        8/1990
(Continued)

OTHER PUBLICATIONS

English machine translation of JP2001-011784. (Year: 2001).*
(Continued)

*Primary Examiner* — Robert C Dye
(74) *Attorney, Agent, or Firm* — Venable LLP

(57) ABSTRACT

A tire includes a tread and a crown reinforcement arranged radially internal to the tread. The crown reinforcement includes a protective reinforcement and a working reinforcement. The protective reinforcement includes a protective ply that exhibits a force at break greater than or equal to 1300 daN·cm$^{-1}$. The protective ply includes protective reinforcing elements, each of which exhibits a force at break greater than or equal to 3000 N. The working reinforcement is arranged radially internal to the protective reinforcement and includes a working ply. The working ply includes working reinforcing elements, each of which includes a
(Continued)

working cord formed of at least a strand that includes an external layer of unsaturated threads.

20 Claims, 2 Drawing Sheets

(52) U.S. Cl.
CPC .... *D07B 1/0613* (2013.01); *B60C 2009/0085* (2013.01); *B60C 2009/0092* (2013.01); *B60C 2009/209* (2013.01); *B60C 2009/2048* (2013.01); *B60C 2009/2077* (2013.01); *B60C 2009/2083* (2013.01); *B60C 2009/2096* (2013.01); *B60C 2200/065* (2013.01); *D07B 2201/2029* (2013.01); *D07B 2401/208* (2013.01)

(58) Field of Classification Search
USPC ...................................................... 152/535
See application file for complete search history.

(56) References Cited

U.S. PATENT DOCUMENTS

| | | | | |
|---|---|---|---|---|
| 5,688,344 | A | 11/1997 | Kobayashi et al. | 152/527 |
| 5,806,296 | A * | 9/1998 | Kaneko | D07B 1/062 |
| | | | | 57/206 |
| 6,817,395 | B2 | 11/2004 | Sinopoli et al. | 152/527 |
| 2001/0023730 | A1* | 9/2001 | Sinopoli | B60C 9/0007 |
| | | | | 152/526 |
| 2004/0089391 | A1 | 5/2004 | Jallais et al. | 152/527 |
| 2006/0237110 | A1 | 10/2006 | Barguet et al. | 152/451 |
| 2007/0144648 | A1* | 6/2007 | Sinopoli | D07B 1/0613 |
| | | | | 152/527 |
| 2008/0110545 | A1* | 5/2008 | Kobayashi | B60C 9/2006 |
| | | | | 152/527 |
| 2009/0101266 | A1* | 4/2009 | Barguet | B60C 9/0007 |
| | | | | 152/527 |
| 2012/0227885 | A1* | 9/2012 | Cheng | D07B 1/0613 |
| | | | | 152/451 |
| 2015/0136295 | A1 | 5/2015 | Barguet et al. | B60C 9/0007 |
| 2015/0159325 | A1 | 6/2015 | Barguet et al. | D07B 5/12 |
| 2015/0329995 | A1 | 11/2015 | Clement et al. | D02G 3/38 |
| 2017/0203613 | A1 | 7/2017 | Domingo et al. | |

FOREIGN PATENT DOCUMENTS

| | | | |
|---|---|---|---|
| EP | 0 602 733 | A1 | 6/1994 |
| FR | 2969181 | * | 6/2012 |
| FR | 2990963 | * | 11/2013 |
| JP | H07-108602 | B2 | 11/1995 |
| JP | H09-143890 | A | 6/1997 |
| JP | H11-093087 | * | 4/1999 |
| JP | 2001-011784 | * | 1/2001 |
| JP | 2009-067321 | A | 4/2009 |
| WO | WO 02/090135 | A1 | 11/2002 |
| WO | WO 2013/174896 | A1 | 11/2013 |

OTHER PUBLICATIONS

English machine translation of FR 2969181. (Year: 2012).*
English machine translation of JPH11-093087. (Year: 1999).*
International Search Report issued by WIPO dated Jul. 20, 2015, in connection with International Application No. PCT/EP2015/058712 (with English translation attached).
A. Domingo, U.S. Appl. No. 15/304,976, filed Apr. 22, 2015.
Jul. 20, 2015 International Search Report and Written Opinion in International Patent Appln. No. PCT/EP2015/058712.

* cited by examiner

TIRE FOR HEAVY INDUSTRIAL VEHICLE

FIELD OF THE INVENTION

The invention relates to a tire, notably for construction plant vehicles.

RELATED ART

A tire for a construction plant vehicle, having a radial carcass reinforcement comprising a tread, two inextensible beads, two sidewalls connecting the beads to the tread and a crown reinforcement, disposed circumferentially between the carcass reinforcement and the tread, is known from the prior art. This crown reinforcement comprises several rubber plies, possibly reinforced with reinforcing elements such as metal cords.

The crown reinforcement comprises at least two superposed plies, known as working plies, the reinforcing cords of which are disposed virtually parallel to one another within a ply but are crossed from one ply to the other, that is to say inclined, symmetrically or asymmetrically, with respect to the median circumferential plane, at an angle which is generally between 15° and 40° depending on the type of tire in question.

The crown reinforcement also comprises one or more plies, known as protective plies, that are intended to protect the rest of the crown reinforcement from external attack, notably perforations.

In this type of tire, the crown reinforcement can also comprise further plies, for example plies known as hooping plies that comprise cords oriented substantially in the circumferential direction (also known as zero degree plies), regardless of whether they are radially on the outside or inside with respect to the working plies.

Such a tire of a heavy industrial vehicle is subjected to numerous attacks. This is because this type of tire is usually run over an uneven road surface which sometimes results in perforations of the tread and part of the crown reinforcement, notably the protective plies.

A consequence of these perforations is the ingress of corrosive agents, for example air and water, which oxidize the metal cords of the crown reinforcement and notably the cords of the working plies when the cords of the protective reinforcement have deteriorated too much. Moreover, these perforations allow the ingress of solid bodies, for example stones which, under the rolling effect of the tire, travel radially towards the inside of the crown reinforcement until they reach the protective plies. The continuous rubbing of these solid bodies against the metal cords of the protective plies causes the latter to deteriorate through wear, leaving the working plies unprotected, which are in turn attacked by the corrosive agents and deteriorate.

Regardless of whether by deterioration of the protective plies or deterioration of the working plies, the tire often becomes unusable, even though the tread has a significant remaining thickness. The non-use of this remaining thickness causes a financial loss for the user of the tire.

BRIEF DESCRIPTION OF EMBODIMENTS OF THE INVENTION

The aim of the invention is therefore a tire that makes it possible to maximize the use of the tread.

To this end, the subject of the invention is a tire comprising a tread and a crown reinforcement arranged radially on the inside of the tread, the crown reinforcement comprising:

a protective reinforcement comprising at least one protective ply that exhibits a force at break greater than or equal to 1300 daN·cm$^{-1}$, the protective ply comprising reinforcing elements known as protective reinforcing elements, each protective reinforcing element exhibiting a force at break greater than or equal to 3000 N;

a working reinforcement that is arranged radially on the inside of the protective reinforcement and comprises at least one working ply comprising reinforcing elements known as working reinforcing elements, each working reinforcing element comprising a working cord comprising at least one strand comprising at least one internal layer of threads and an external layer of threads wrapped helically around the internal layer, the external layer of threads being unsaturated.

The protective ply of the tire according to the invention exhibits particularly high resistance to attack. This is because the combination of a high force at break of the ply and a high force at break of each cord makes it possible to ensure maximum endurance of the protective ply. In contrast to a ply with a low force at break, for which a local stress that is too high could not be absorbed by the protective ply, the protective ply of the tire according to the invention exhibits a sufficient force at break to react most of the forces imposed by an uneven road surface without risk of breakage. In contrast to a ply comprising cords with a low individual force at break, for which a local stress that is too high would result in breakage of one or more cords, and then in breakage of the other cords, one by one, the cords of the protective ply of the tire according to the invention also exhibit a sufficient individual force at break to absorb the forces imposed by an uneven road surface.

The lack of saturation of the external layer of the strands of the cords of the working ply makes it possible to obtain cords that are able to be penetrated to a high degree by the rubber. Thus, while the tire is being manufactured, as much rubber as possible is made to penetrate into all of the spaces between the threads of the external layer. This is because, if this penetration is insufficient, too many empty channels or capillaries form along the cord, and the corrosive agents that are likely to pass into the tire following attack travel along these channels and reduce the lifetime of the cord and thus that of the working plies.

In addition to these effects which are specific to each of the protective and working plies and make it possible to extend their respective lifetimes, the combination of characteristics of these plies makes it possible to use virtually the entire tread by virtue of a synergistic effect, the scale of which has surprised the inventors originating the invention. This synergistic effect is demonstrated in the comparative tests described below.

The total use of the tread thus makes it possible to limit, or even eliminate, the financial loss associated with the non-use of part of the tread on account of premature deterioration of the crown reinforcement.

As far as the reinforcing elements are concerned, the measurements of the force at break denoted Fr (maximum load in N) are carried out under traction as per the standard ISO 6892-1, October 2009, on reinforcing elements removed from tires, preferably substantially new ones, comprising the rubber of the tire. As far as the plies of reinforcing elements are concerned, the force at break of the ply, denoted Fm, is obtained by dividing the force at break Fr by the laying pitch. It will be recalled that the laying pitch is the axis-to-axis distance between two adjacent reinforcing elements.

By definition, an unsaturated layer of threads is such that there is sufficient room in this layer to add at least one (X+1)th thread having the same diameter as the X threads of the layer thereto, it thus being possible for a plurality of threads to be in contact with one another. Conversely, this layer is referred to as saturated if there is not enough room in this layer to add at least one (X+1)th thread having the same diameter as the N threads of the layer thereto.

In the present application, any range of values denoted by the expression "between a and b" represents the range of values from more than a to less than b (that is to say excluding the end points a and b), whereas any range of values denoted by the expression "from a to b" means the range of values from the end point "a" as far as the end point "b", namely including the strict end points "a" and "b".

Preferably, each protective and/or working reinforcing element is a filamentary element. A filamentary element means any longilinear element of great length relative to its cross section, whatever the shape of the latter, for example circular, oblong, rectangular or square, or even flat, it being possible for this filamentary element to be rectilinear or non-rectilinear, for example twisted, or wavy.

Preferably, the protective and/or working reinforcing elements are metallic. Metallic is understood by definition to mean a reinforcing element the mass of which is made up predominantly (i.e. more than 50% of these wires) or entirely (100% of the wires) of a metallic material, for example steel.

When a carbon steel is used, its carbon content (% by weight of steel) is preferably between 0.5% and 0.9%. Use is preferably made of a steel of the normal tensile (NT), high tensile (HT) or super high tensile (SHT) steel cord type, the tensile strength (Rm) of which is preferably greater than 2500 MPa, more preferably greater than 3000 MPa and even more preferably 3500 MPa (measurement carried out under traction as per the standard ISO 6892-1, 2009).

Preferably, the tire comprises a carcass reinforcement arranged radially on the inside of the crown reinforcement and anchored in two beads, a sidewall connecting each bead to the tread.

In a preferred embodiment, the protective reinforcement is interposed radially between the tread and the working reinforcement.

Advantageously, the tire comprises a crown surmounted by the tread, two sidewalls, two beads, each sidewall connecting each bead to the crown, and a carcass reinforcement that is anchored in each of the beads and extends through the sidewalls towards the crown.

In a preferred embodiment, the carcass reinforcement is arranged radially on the inside of the crown reinforcement.

Advantageously, the carcass reinforcement comprises at least one carcass ply comprising reinforcing elements known as carcass reinforcing elements, the carcass reinforcing elements making an angle greater than or equal to 65°, preferably greater than or equal to 80° and more preferably in the range from 80° to 90° with respect to the circumferential direction of the tire.

In a preferred embodiment, the tire has a size of the W R U type, in which U≥35, preferably U≥49 and more preferably U≥57.

Protective Reinforcement

Advantageously, the protective reinforcement comprises two protective plies, each protective ply exhibiting a force at break greater than or equal to 1300 daN·cm$^{-1}$, each protective reinforcing element of each protective ply exhibiting a force at break greater than or equal to 3000 N. In this way, the protection of the working plies and the endurance of the tire in general are improved further.

Advantageously, the force at break of each protective ply is greater than or equal to 1400 daN·cm$^{-1}$, preferably greater than or equal to 1500 daN·cm$^{-1}$ and more preferably greater than or equal to 1600 daN·cm$^{-1}$.

Advantageously, the force at break of each protective reinforcing element is greater than or equal to 3500 N, preferably greater than or equal to 4500 N and more preferably greater than or equal to 5500 N.

The combination of a relatively high ply force at break and a relatively high individual force at break of the reinforcing elements makes it possible to ensure that a protective reinforcement having sufficient cords to react the forces is provided and that these cords are all sufficiently strong. In this way, the use of cords that are strong but too spaced apart and of plies that are dense but not strong enough is avoided.

Advantageously, the pitch at which the protective reinforcing elements are laid ranges from 1.2 to 6.5 mm, preferably from 2.5 to 5.0 mm, and more preferably from 3.5 to 4.5 mm. A laying pitch that is too large would result in forces being reacted by a limited number of reinforcing elements and in a risk of these reinforcing elements breaking one by one. A laying pitch that is too small would result in a heavy tire, increasing the industrial manufacturing cost of the tire and not necessarily giving it greater endurance.

Optionally, the reinforcing elements of the protective ply or plies make an angle at least equal to 10°, preferably in the range from 10° to 35° and more preferably from 15° to 35°, with the circumferential direction of the tire.

Preferably, each protective reinforcing element comprises a protective cord comprising at least one strand comprising at least one internal layer of threads and an external layer of threads wrapped helically around the internal layer, the external layer being unsaturated. The lack of saturation of the external layer of the strand or strands of the protective cord makes it possible to obtain cords that are able to be penetrated to a high degree by the rubber. By virtue of the penetration of the rubber, the formation of too many empty channels or capillaries along the cord, and the risk of corrosive agents passing into the tire following attack, the travel of said corrosive agents along these channels and the reduction in the lifetime of the cord and thus that of the working plies are avoided.

In addition to making the cord elastic, this separation of the wires and of the strands with respect to the axis of the strand and the axis of the cord, respectively, encourages the rubber to pass between the wires of each strand and between the different strands. Resistance to corrosion is thus improved.

In another embodiment, each protective reinforcing element comprises a cord, known as a protective cord, of the structure (K+L)×(M+P), comprising:
 an internal layer of the cord made up of K internal strand(s),
 an external layer of the cord made up of L external strands wrapped helically around the internal layer of the cord,
 each internal and external strand comprising:
 an internal layer of the strand made up of M internal thread(s) and
 an external layer of the strand made up of N external threads wrapped helically around the internal layer of the strand.

In this other embodiment, preferably K>1 and/or M>1.

Thus, preferably, on account of its (K+L)×(M+P) structure where K>1 and M>1, the cord is of the "HE" type, that is to say has high elasticity. The cords therefore deform easily regardless of the road surface, notably on uneven ground.

In this embodiment, the external layer of the cord is unsaturated.

By definition, an unsaturated layer of strands is such that there is sufficient room in this layer to add at least one (L+1)th strand having the same diameter as the L strands of the layer thereto, it thus being possible for a plurality of strands to be in contact with one another. Conversely, this layer is referred to as saturated if there is not enough room in this layer to add at least one (L+1)th strand having the same diameter as the L strands of the layer thereto.

Thus, the cord exhibits high resistance to corrosion. Specifically, the lack of saturation of the external layer of the cord makes it possible to create at least one passage opening for the rubber between two external strands such that the rubber can penetrate effectively during the vulcanization of the tire.

In another embodiment, each protective reinforcing element comprises a cord, known as a protective cord, of the structure K×(M+P), comprising a single layer made up of K strands, each strand comprising:
- an internal layer of the strand made up of M internal thread(s) and
- an external layer of the strand made up of N external threads wrapped helically around the internal layer of the strand.

Working Reinforcement

Advantageously, the working reinforcement comprises two working plies, each working ply comprising working reinforcing elements, each working reinforcing element of each working ply comprising a working cord comprising at least one strand comprising at least one internal layer of threads and an external layer of threads wrapped helically around the internal layer, the external layer being unsaturated.

Advantageously, the inter-thread distance of the threads in the external layer is greater than or equal to 25 µm, or even greater than or equal to 30 µm, preferably greater than or equal to 40 µm and more preferably greater than or equal to 50 µm. The inter-thread distance of a layer is defined, in a section of the cord perpendicular to the main axis of the cord, as being the smallest distance, on average in said layer, between two adjacent threads of said layer. Thus, channels allow the rubber to pass both through the external layer and through the intermediate layer so as to cause the rubber to penetrate effectively into the cord during the vulcanization of the tire.

Preferably, each working cord comprises at least one internal layer of the cord comprising at least one internal strand and an external layer of the cord comprising several external strands. Each external strand comprises at least one internal layer of threads and an external layer of threads wrapped helically around the internal layer of threads, the external layer of threads being unsaturated. This allows the rubber to penetrate through the external strands of the cords of the working reinforcement.

Advantageously, the force at break of each working ply is greater than or equal to 2000 daN·cm$^{-1}$, preferably greater than or equal to 3500 daN·cm$^{-1}$ and more preferably greater than or equal to 4000 daN·cm$^{-1}$.

Advantageously, the force at break of each working reinforcing element is greater than or equal to 15 000 N, preferably greater than or equal to 20 000 N and more preferably greater than or equal to 25 000 N.

Advantageously, the pitch at which each working reinforcing element is laid ranges from 3.5 to 7.5 mm, preferably from 4.0 to 7.0 mm, and more preferably from 4.5 to 6.5 mm.

Optionally, the working reinforcing elements are crossed from one working ply to the other and make an angle at most equal to 60°, preferably in the range from 15° to 40°, with the circumferential direction of the tire.

Preferably, with the reinforcing element comprising an internal layer of the cord made up of J internal strand(s) and an external layer of the cable made up of Q external strands, the strand comprising an unsaturated external layer of threads is one of the Q external strands. More preferably, each of the Q external strands comprises an unsaturated external layer of threads. Even more preferably, each of the Q external strands and each of the J internal strand(s) comprises an unsaturated external layer of threads.

In one embodiment, each working cord is of the structure (J+Q)×(A+B) and comprises:
- an internal layer of the cord made up of J internal strand(s),
- an external layer of the cord made up of Q external strands wrapped helically around the internal layer of the cord, each internal and external strand comprising:
- an internal layer of the strand made up of A internal thread(s) and
- an external layer of the strand made up of B external threads wrapped helically around the internal layer of the strand.

In another embodiment, each working cord is of the structure (J+Q)×(A+C+B) and comprises:
- an internal layer of the cord made up of J internal strand(s),
- an external layer of the cord made up of Q external strands wrapped helically around the internal layer of the cord, each internal and external strand comprising:
- an internal layer of the strand made up of A internal thread(s) and
- an intermediate layer of the strand made up of C intermediate threads wrapped helically around the internal layer of the strand, and
- an external layer of the strand made up of B external threads wrapped helically around the intermediate layer of the strand.

Hoop Reinforcement

In one embodiment, the crown reinforcement comprises a hoop reinforcement comprising at least one hooping ply. Preferably, the hoop reinforcement comprises two hooping plies.

Advantageously, each hooping ply comprises reinforcing elements known as hoop reinforcing elements, the hoop reinforcing elements making an angle at most equal to 10°, preferably in the range from 5° to 10°, with the circumferential direction of the tire.

In a preferred embodiment, the hoop reinforcement is arranged radially on the inside of the working reinforcement.

In another embodiment, the hoop reinforcement is arranged between the working reinforcement and the protective reinforcement.

In a preferred embodiment of the invention, each hooping ply exhibits a force at break $Fm_{NSF}$ greater than or equal to 1300 daN·cm$^{-1}$, preferably greater than or equal to 1500 daN·cm$^{-1}$, more preferably greater than or equal to 1800 daN·cm$^{-1}$ and even more preferably greater than or equal to 2000 daN·cm$^{-1}$.

In one embodiment, each hoop reinforcing element exhibits a force at break greater than or equal to 2500 N, preferably greater than or equal to 4000 N, more preferably greater than or equal to 6000 N and even more preferably greater than or equal to 8500 N.

In another embodiment, the pitch at which the hoop reinforcing elements are laid ranges from 1.8 to 6.5 mm, preferably from 3.0 to 5.5 mm, and more preferably from 3.7 to 4.8 mm.

BRIEF DESCRIPTION OF THE DRAWINGS

The invention will be better understood from reading the following description, given solely by way of non-limiting example and with reference to the drawings in which.

DETAILED DESCRIPTION OF EMBODIMENTS OF THE INVENTION

Examples of Tires According to the Invention

In the following description, when the term "radial" is used, it is appropriate to make a distinction between several different uses of the word by a person skilled in the art. Firstly, the expression refers to a radius of the tire. It is within this meaning that a point, ply or reinforcement P1 is said to be "radially inside" a point, ply or reinforcement P2 (or "radially on the inside" of the point P2) if it is closer to the rotation axis of the tire than the point, ply or reinforcement P2. Conversely, a point, ply or reinforcement P3 is said to be "radially outside" a point, ply or reinforcement P4 (or "radially on the outside" of the point, ply or reinforcement P4) if it is further away from the rotation axis of the tire than the point, ply or reinforcement P4. Progress will be said to be "radially inwards (or outwards)" when it is in the direction of smaller (or larger) radii. It is this sense of the word that applies also when radial distances are being discussed.

On the other hand, a reinforcing element or a reinforcement is said to be "radial" when the reinforcing element or the reinforcing elements of the reinforcement make an angle greater than or equal to 65° and less than or equal to 90° with the circumferential direction.

An "axial" direction is a direction parallel to the axis of rotation of the tire. A point, ply or reinforcement P5 is said to be "axially inside" a point, ply or reinforcement P6 (or "axially on the inside" of the point, ply or reinforcement P6) if it is closer to the median plane M of the tire than the point, ply or reinforcement P6. Conversely, a point, ply or reinforcement P7 is said to be "axially outside" a point P8 (or "axially on the outside" of the point, ply or reinforcement P8) if it is further away from the median plane M of the tire than the point, ply or reinforcement P8. The "median plane" M of the tire is the plane which is normal to the axis of rotation of the tire and which is situated equidistantly from the annular reinforcing structures of each bead.

A "circumferential" direction is a direction which is perpendicular both to a radius of the tire and to the axial direction.

A frame of reference X, Y, Z corresponding to the usual axial, radial and circumferential orientations, respectively, of a tire has been depicted in the figures.

Figure 1:
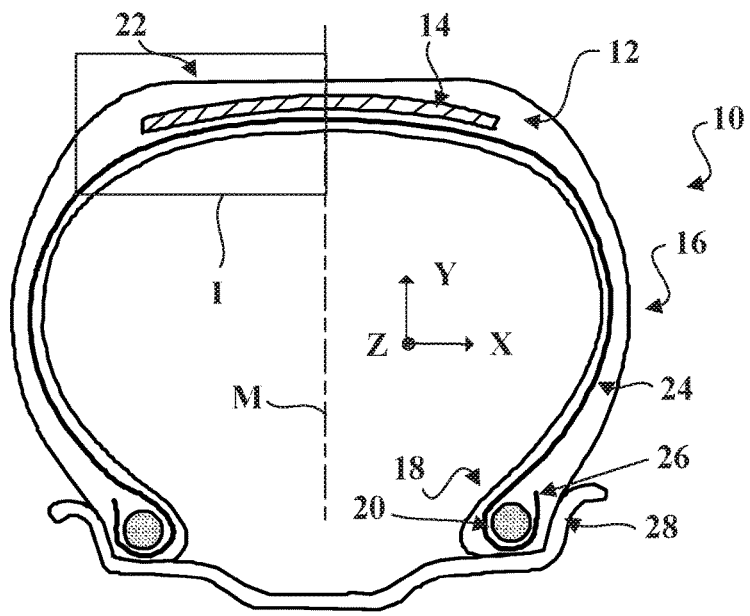
FIG. 1 is a simplified view in section of a tire according to a first embodiment of the invention.
Figure 2:
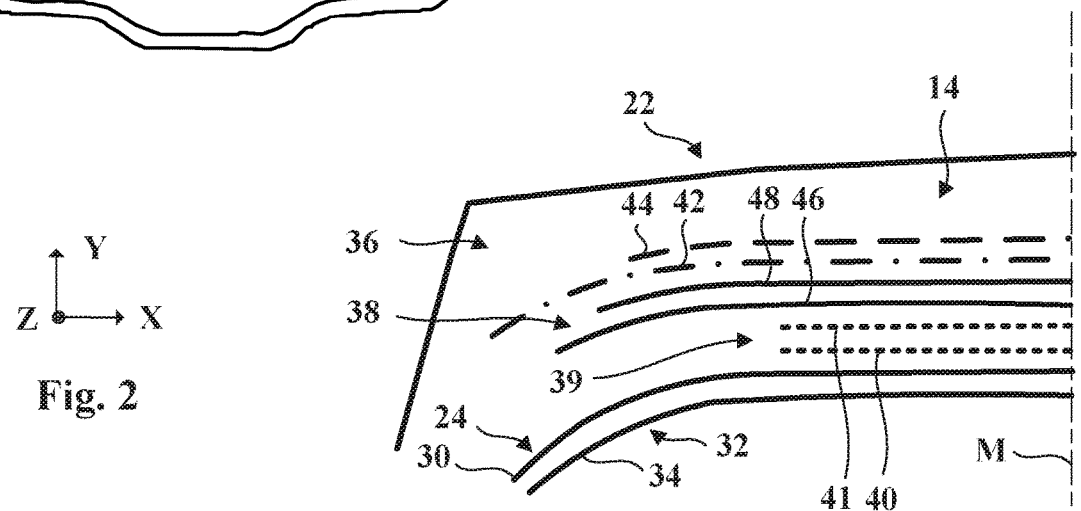
FIG. 2 is a detail view of the part I of the tire in FIG. 1.

FIGS. 1 and 2 show a tire for a construction plant-type vehicle, for example of the "dumper" type, denoted by the overall reference 10. Thus, the tire 10 has a size of the W R U type, for example 40.00 R 57 or 59/80 R 63.

In a manner known to a person skilled in the art, W:
when it is in the form H/B, denotes the nominal aspect ratio H/B as defined by the ETRTO (H being the height of the section of the tire and B being the width of the section of the tire) and,
when it is in the form H.00 or B.00, in which H=B, H and B being as defined above. U represents the diameter, in inches, of the rim seat on which the tire is intended to be mounted, and R denotes the type of carcass reinforcement of the tire, in this case radial. U≥35, preferably U≥49 and more preferably U≥57.

The tire 10 has a crown 12 reinforced by a crown reinforcement 14, two sidewalls 16 and two beads 18, each of these beads 18 being reinforced with a bead wire 20. The crown 12 is surmounted by a tread 22. The crown reinforcement 14 is arranged radially on the inside of the tread 22. A carcass reinforcement 24, arranged radially on the inside of the crown reinforcement 14, is anchored in each bead 18, in this case wrapped around each bead wire 20 and comprises a turn-up 26 disposed towards the outside of the tire 10, which is shown mounted on a rim 28 here.

The carcass reinforcement 24 comprises at least one carcass ply 30 comprising reinforcing elements known as carcass reinforcing elements (not shown). The carcass reinforcing elements make an angle greater than or equal to 65°, preferably greater than or equal to 80° and more preferably in the range from 80° to 90°, with the circumferential direction of the tire. The carcass reinforcing elements are arranged substantially parallel to one another and extend from one bead 18 to the other. Examples of such carcass reinforcing elements are described in the documents The tire 10 also comprises a sealing ply 32 made up of an elastomer (commonly known as "inner liner") which defines the radially internal face 34 of the tire 10 and which is intended to protect the carcass ply 30 from the diffusion of air coming from the space inside the tire 10.

The crown reinforcement 14 comprises, radially from the outside to the inside of the tire 10, a protective reinforcement 36 arranged radially on the inside of the tread 22, a working reinforcement 38 arranged radially on the inside of the protective reinforcement 36 and a hoop reinforcement 39 arranged radially on the inside of the working reinforcement 38. Thus, the protective reinforcement 36 is interposed radially between the tread 22 and the working reinforcement 38.

The protective reinforcement 36 comprises first and second protective plies 42, 44, the first protective ply 42 being arranged radially on the inside of the second protective ply 44.

The working reinforcement 38 comprises first and second working plies 46, 48, the first working ply 46 being arranged radially on the inside of the second working ply 48.

The hoop reinforcement 39, also known as limiting block, the function of which is to partially absorb the mechanical stresses due to inflation, comprises first and second hopping plies 40, 41, the first hooping ply 40 being arranged radially on the inside of the second hooping ply 41.

Figure 3:
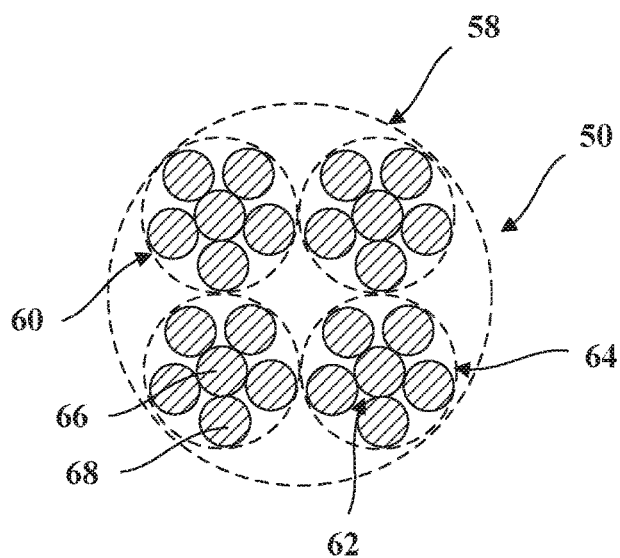
FIG. 3 is a view in section perpendicular to the axis of the protective reinforcing element (presumed to be rectilinear and at rest) of a reinforcing element of a protective ply of the tire in FIG. 1.
Figure 4:
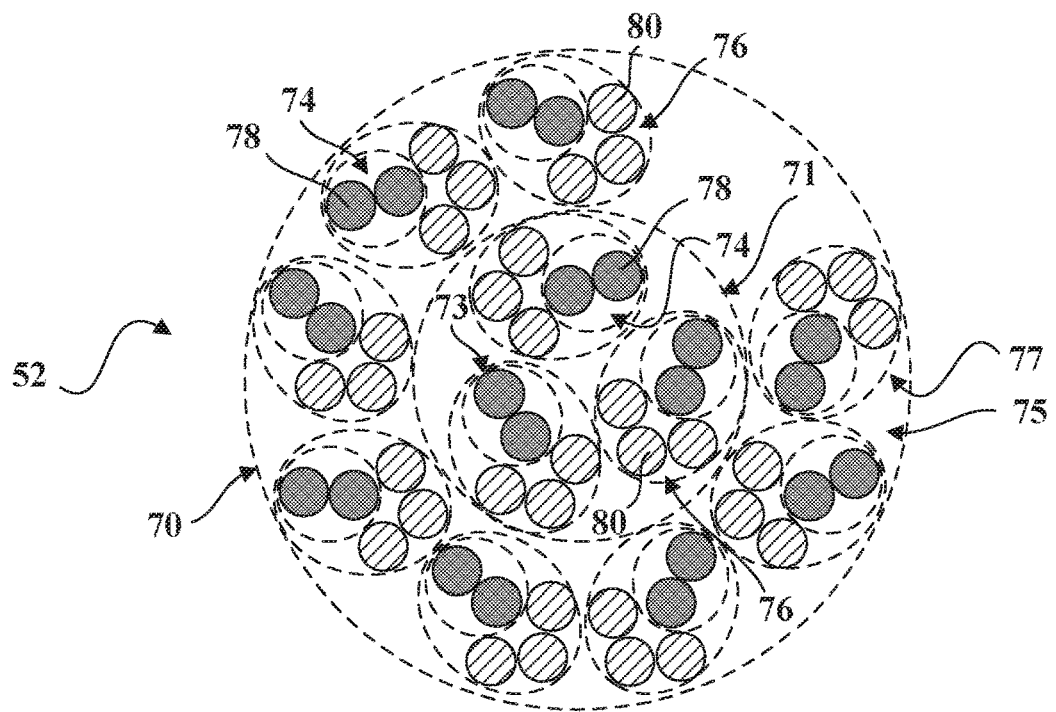
FIG. 4 is a view similar to that in FIG. 3 of a reinforcing element of a protective ply of the tire in FIG. 1.
Figure 5:
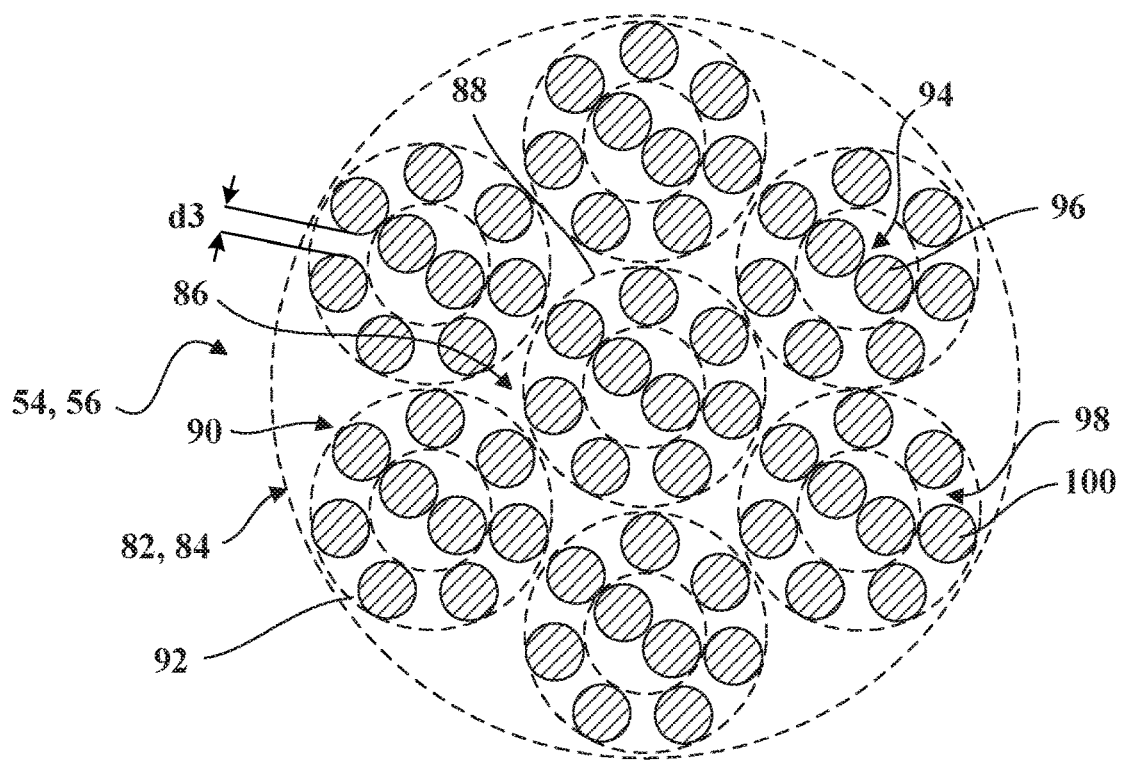
FIG. 5 is a view similar to that in FIG. 3 of a reinforcing element of a working ply of the tire in FIG. 1.

FIGS. 3, 4 and 5 show a first protective reinforcing element 50 of the first protective ply 42, a second protective reinforcing element 52 of the second protective ply 44 and a working reinforcing element 54, 56 of the first and second working plies 46, 48, respectively. In a variant, the working reinforcing elements 54, 56 of the first and second working plies 46, 48 can be different.

Each of these elements 50, 52, 54, 56 comprises a metal cord.

The term "metal cord" is understood by definition to mean a cord formed of wires made up predominantly (i.e. more than 50% of these wires) or entirely (100% of the wires) of a metallic material. The invention is preferably implemented with a steel cord, more preferably a cord made of pearlitic (or ferritic-pearlitic) carbon steel referred to as "carbon steel" below, or else made of stainless steel (by definition steel comprising at least 11% chromium and at least 50% iron). However, it is of course possible to use other steels or other alloys.

When a carbon steel is used, its carbon content (% by weight of steel) is preferably between 0.7% and 0.9%. These contents represent a good compromise between the required mechanical properties of the tire and the feasibility of the threads. The metal or steel used is covered with a metal layer, in this case a layer of brass (Zn—Cu alloy) or zinc.

Protective Reinforcement

With reference to FIG. 3, each first protective reinforcing element 50 of the first protective ply 42 comprises a metal cord 58, known as a protective metal cord, of structure K'×(M'+P').

Each protective metal cord 58 comprises K' strands 60 wrapped helically at a pitch p. Each strand 60 comprises an internal layer 62 of the strand and an external layer 64 of the strand. The internal layer 62 is made up of M' internal thread(s) 66 wrapped helically at a pitch p1. The external layer 64 is made up of P' external threads 68 wrapped helically around the internal layer 62 at the pitch p2.

The P' external threads 68 are wrapped in the same direction as the K' strands 60. In a variant, they are wrapped in different directions.

The external layer 64 is unsaturated.

In the example in FIG. 3, K'=4, M'=1 and P'=5.

The pitch p is greater than or equal to 3 mm and less than or equal to 15 mm, preferably greater than or equal to 5 mm and less than or equal to 10 mm. In this case, p=8 mm. The pitch p1 is infinite here. The pitch p2 is greater than or equal to 3 mm and less than or equal to 10. In this case, p2=5 mm.

The diameter D1, D2 of the internal thread(s) 66 and external threads 68, respectively, is greater than or equal to 0.10 mm and less than or equal to 0.50 mm, preferably greater than or equal to 0.15 mm and less than or equal to 0.35 mm, in this case equal to 0.26 mm.

Thus, in line with conventional nomenclature, the cord 58 is known as a "24.26" cord.

The force at break $Fr_{NSP1}$ of each first protective reinforcing element 50 is equal to 2550 N. The pitch at which the first protective reinforcement elements 50 are laid is equal to 2.5 mm. The force at break $Fm_{NSP1}$ of the first protective ply 42 is equal to 1020 daN·cm$^{-1}$.

With reference to FIG. 4, each second protective reinforcing element 52 of the second protective ply 44 comprises a metal cord 70, known as a protective metal cord, of structure (K+L)×(M+P). Thus, in this embodiment, each metal cord 70 comprises an internal layer 71 of the cord made up of K internal strands 73 and an external layer 75 of the cord made up of L>1 external strands 77 wrapped helically around the internal layer 71. Preferably, K>1.

The external layer 75 of the cord is unsaturated.

Each internal strand 73 and external strand 77 comprises an internal layer 74 made up of M internal threads 78 and an external layer 76 made up of P external threads 80. The external layer 76 of each internal strand 73 and external strand 77 is unsaturated.

For the cord 70 in FIG. 4, K=3, L=8, M=2 and P=3.

The M internal threads 78 of each of the K internal strands 73 are wrapped helically at a pitch p1i, where p1i=7.5 mm. The P external threads 80 of each of the K internal strands 73 are wrapped helically at a pitch p2i, where p2i=5 mm.

The M internal threads 78 of each of the L external strands 77 are wrapped helically at a pitch p1e, where p1e=15 mm here. The P external threads 80 of each of the L external strands 77 are wrapped at a pitch p2e, where p2e=7.5 mm here.

The internal strands 73 are wrapped helically at a pitch pi, where pi equals 7.5 mm here. The external strands 77 are wrapped helically around the internal layer 71 at a pitch pe, where pe=15 mm here.

The M internal threads 78 are wrapped in the same direction as the P external threads 80 and in the same direction as the K strands 73. In a variant, the M internal threads 78 are wrapped in the same direction as the P external threads 80 and in the opposite wrapping direction to the K strands 73.

The K internal strands 73 and the L external strands 77 are wrapped in the same twisting direction.

The diameter D1, D2 of the internal thread(s) 78 and external threads 80, respectively, is greater than or equal to 0.10 mm and less than or equal to 0.50 mm, preferably greater than or equal to 0.15 mm and less than or equal to 0.35 mm, in this case equal to 0.26 mm.

Thus, in line with conventional nomenclature, the cords 70 are known as "55.26" cords.

The force at break $Fr_{NSP2}$ of each second protective reinforcing element 52 is greater than or equal to 3000 N, or even 3500 N, preferably greater than or equal to 4500 N and more preferably greater than or equal to 5500 N. In this case, $Fr_{NSP2}$=6325 N.

The pitch at which the second protective reinforcing elements 52 are laid ranges from 1.2 to 6.5 mm, preferably from 2.5 to 5.0 mm, and more preferably from 3.5 to 4.5 mm and in this case is equal to 3.7 mm.

The force at break $Fm_{NSP2}$ of the second protective ply 44 is greater than or equal to 1300 daN·cm$^{-1}$, or even greater than or equal to 1400 daN·cm$^{-1}$, preferably greater than or equal to 1500 daN·cm$^{-1}$ and more preferably greater than or equal to 1600 daN·cm$^{-1}$. In this case, $Fm_{NSP2}$=1709 daN·cm$^{-1}$.

The first protective reinforcing elements 50 and second protective reinforcing elements 52 make, within each first protective ply 42 and second protective ply 44, respectively, at least equal to 10°, preferably in the range from 10° to 35° and more preferably 15° to 35°, with the circumferential direction Z of the tire 10, and in this case equal to 24°. The protective reinforcing elements 50, 52 are substantially parallel to one another within each protective ply 42, 44 and are crossed from one protective ply 42, 44 to the other.

Working Reinforcement

With reference to FIG. 5, each working reinforcing element 54, 56 of the first and second working plies 46, 48 respectively comprises a metal cord 82, 84, known as a working metal cord, of structure (J+Q)×(A+B).

Each cord 82, 84 comprises an internal layer 86 of the cord made up of J internal strand(s) 88 and an external layer 90 of the cord made up of Q external strands 92 wrapped helically around the internal layer 86. When J>1, the J internal strands are wrapped helically at the pitch pi'. The Q external strands are wrapped at the pitch pe'.

Each internal strand 88 and external strand 92 comprises an internal layer 94 made up of A internal strand(s) 96 and an external layer 98 made up of B external strands 100 wrapped helically around the internal layer 94. When A>1, the A internal strands 96 are wrapped helically.

In the example in FIG. 5, J=1, Q=6, A=2, B=7.

The A internal threads 96 of each of the J internal strands 88 are wrapped helically at a pitch p1$i'$, where p1$i'$=7.5 mm here. The B external threads 100 of each of the Q internal strands 88 are wrapped helically at a pitch p2$i'$, where p2$i'$=5 mm here.

The A internal threads 96 of each of the Q external strands 92 are wrapped helically at a pitch p1$e'$, where p1$e'$=15 mm here. The B external threads 100 of each of the Q external strands 92 are wrapped at a pitch p2$e'$, where p2$e'$=7.5 mm here.

The internal strands 88 are wrapped helically at a pitch p$i'$, where p$i'$=7.5 mm here. The external strands 92 are wrapped helically around the internal layer 86 at a pitch p$e'$, where p$e'$=15 mm here.

Each diameter D1, D2 of the internal threads 96 and external threads 100 is greater than or equal to 0.15 mm and less than or equal to 0.45 mm, preferably greater than or equal to 0.20 mm and less than or equal to 0.40 mm, more preferably greater than or equal to 0.22 mm and less than or equal to 0.38 mm, in this case equal to 0.35 mm.

Thus, in line with conventional nomenclature, each cord 82, 84 is known as a "63.35" cord.

The external layer 98 of B external threads 100 is unsaturated. The inter-thread distance d3 between the external threads 100 of the external layer 98 is greater than or equal to 25 µm, or even greater than or equal to 30 µm, preferably greater than or equal to 40 µm and more preferably greater than or equal to 50 µm. In this case, d3=75 µm. The A internal threads 96 and the B external threads 100 are wrapped in different wrapping directions. In a variant, they are wrapped in identical wrapping directions.

The force at break $Fr_{NST1}$, $Fr_{NST2}$ of each working reinforcing element 54, 56 is greater than or equal to 15 000 N. In this case, $Fr_{NST1}$=$Fr_{NST2}$=17 400 N. In other embodiments, the force at break $Fr_{NST1}$, $Fr_{NST2}$ of each working reinforcing element 54, 56 is greater than or equal to 20 000 N and more preferably greater than or equal to 25 000 N.

The pitch at which each first and second working reinforcing element 54, 56 is laid ranges from 3.5 to 7.5 mm, preferably from 4.0 to 7.0 mm, and more preferably from 4.5 to 6.5 mm and in this case is equal to 5.5 mm.

The force at break $Fm_{NST1}$, $Fm_{NST2}$ of each first and second working ply 46, 48 is greater than or equal to 2000 daN·cm$^{-1}$. In this case, $Fm_{NST1}$=$Fm_{NST2}$=3164 daN·cm$^{-1}$. In other embodiments, the force at break $Fm_{NST1}$, $Fm_{NST2}$ of each first and second working ply 46, 48 is greater than or equal to 3500 daN·cm$^{-1}$ and more preferably greater than or equal to 4000 daN·cm$^{-1}$.

The first working reinforcing elements 54 and second working reinforcing elements 56 make, within each first working ply 46 and second working ply 48, respectively, an angle at most equal to 60°, preferably in the range from 15° to 40°, with the circumferential direction Z of the tire 10, and in this case equal to 19° for the first ply 46 and 33° for the second ply 48. The working reinforcing elements 54, 56 are substantially parallel to one another within each working ply 46, 48 and are crossed from one working ply 46, 48 to the other.

Hoop Reinforcement

Each hooping ply 40, 41 comprises metal hoop reinforcing elements (not shown), for example metal cords identical to the protective reinforcing elements, that make an angle at most equal to 10°, preferably in the range from 5° to 10°, with the circumferential direction Z of the tire 10. In this case, the angle is equal to 8°. The hoop reinforcing elements are crossed from one hooping ply 40, 41 to the other. Thus, in the embodiment illustrated, apart from the angle made by the reinforcing elements of each ply, the hooping plies and protective plies are identical.

Preferably, whether or not it is identical to the protective reinforcing elements, each hoop reinforcing element is made up of a metal cord that has a structure K'×(M'+P'), comprising a single layer made up of K' strands, each strand comprising:

an internal layer of the strand made up of M' internal thread(s) and an external layer of the strand made up of N' external threads wrapped helically around the internal layer of the strand.

Each individual metal thread has a diameter in the range from 0.10 mm to 0.35 mm.

Each hoop reinforcing element exhibits a force at break Fr greater than or equal to 2500 N, preferably greater than or equal to 4000 N, more preferably greater than or equal to 6000 N and even more preferably greater than or equal to 8500 N.

The pitch at which the hoop reinforcing elements of each hooping ply 42, 44 are laid ranges from 1.8 to 6.5 mm, preferably from 3.0 to 5.5 mm, and more preferably from 3.7 to 4.8 mm.

Each hooping ply 40, 41 exhibits a force at break $Fm_{NSF1}$, $Fm_{NSF2}$, respectively, greater than or equal to 1300 daN·cm$^{-1}$, preferably greater than or equal to 1500 daN·cm$^{-1}$, more preferably greater than or equal to 1800 daN·cm$^{-1}$ and even more preferably greater than or equal to 2000 daN·cm$^{-1}$.

In a variant, use may be made of hoop reinforcing elements different from those of the protective reinforcement.

A second embodiment of the invention as described below is also conceivable.

In contrast to the tire according to the first embodiment, the mechanical characteristics of the first and second protective plies 42, 44 are substantially identical. This is because, in contrast to the tire according to the first embodiment, each first and second protective ply 42, 44 comprises first and second protective reinforcing elements 50, 52, respectively, comprising protective metal cords 58, 70 that are identical and, in line with conventional nomenclature, are known as "55.26" cords.

The force at break $Fr_{NSP1}$ of each protective metal cord 58 is greater than or equal to 3000 N, or even 3500 N, preferably greater than or equal to 4500 N and more preferably greater than or equal to 5500 N. In this case, $Fr_{NSP1}$=$Fr_{NSP2}$=6050 N.

The pitch at which the first protective reinforcing elements 50 are laid ranges from 1.2 to 6.5 mm, preferably from 2.5 to 5.0 mm, and more preferably from 3.5 to 4.5 mm.

The force at break $Fm_{NSP1}$ of the first protective ply 42 is greater than or equal to 1300 daN·cm$^{-1}$, or even greater than or equal to 1400 daN·cm$^{-1}$, preferably greater than or equal to 1500 daN·cm$^{-1}$ and more preferably greater than or equal to 1600 daN·cm$^{-1}$. In this case, $Fm_{NSP1}$=$Fm_{NSP2}$=1709 daN·cm$^{-1}$.

Example of a Method For Manufacturing Cords of the Tires According to the Invention The metal cords 58, 70, 82, 84 are manufactured by cabling or else by twisting, using conventional methods known to a person skilled in the art.

Comparative Tests

A prior art tire T0, two control tires T1 and T2 and the tire 10 according to the first embodiment were compared below.

In contrast to the tire 10 according to the invention, each first and second protective ply of the prior art tire T0 comprises metal reinforcing elements comprising "24.26" metal cords described above.

Moreover, in contrast to the tire 10 according to the invention, each first and second working ply of the tire T0 comprises metal reinforcing elements comprising metal cords known as "189.23" cords of structure (J+Q)×(A+B+C), where J=1, Q=6, A=3, B=9 and C=15, and in which all of the threads have a diameter equal to 0.23 mm. The external layer of the C threads of each "189.23" cord is saturated. Specifically, the inter-thread distance d3 of the external layer of each strand of the "189.23" metal cords is equal to 6 µm.

In contrast to the tire 10 according to the invention, each first and second protective ply of the control tire T1 comprises metal reinforcing elements comprising "24.26" metal cords as described above.

In contrast to the tire 10 according to the invention, each first and second working ply of the tire T2 comprises metal reinforcing elements comprising "189.23" metal cords as described above.

The characteristics of the various cords described below are collated in the following Table 1.

TABLE 1

| Ply in question | Cord | | | |
|---|---|---|---|---|
| | 24.26 NSP1 | 55.26 | 189.23 NST1 | 63.35 |
| Laying pitch (mm) | 2.5 | 3.7 | 5.5 | 5.5 |
| Fm of the ply (daN · cm$^{-1}$) | 1050 | 1709 | 3636 | 3164 |
| Fr (N · mm$^2$) | 2550 | 6325 | 20000 | 17400 |
| Lack of saturation external layer | | | No | Yes |
| Inter-thread distance d3 (µm) | | | 6 | 75 |

A significant number of each tire T0, T1, T2 and 10, in this case between 10 and 20, were run on different types of uneven ground, for example extraction mines. Thus, on a first type of ground, a significant number of tires of the prior art T0 were compared with a significant number of control tires T1. On a second type of ground, the same comparison was carried out between the tires T0 and T2. Finally, on a third type of ground, the same comparison was carried out between the tires T0 and 10.

The proportion of tires that had to be removed following an attack on the crown reinforcement that made it impossible to continue running the tire, and in which the wear U on removing the tire was less than 95% at the centre of the tread of the tire, was thus counted.

The proportion of tires for which it was possible to use virtually the entire tread, that is to say in which the wear U on removing the tire was greater than or equal to 95%, was also counted.

The results are summarized in Table 2 below. From experience, the monitors of these tests consider that, for a difference to be significant, a difference of at least 10 points has to be observed.

TABLE 2

| | | | | | Removal with attack to the crown reinforcement and U < 95% | | Removal with U ≥ 95% | |
|---|---|---|---|---|---|---|---|---|
| | NST1 | NST2 | NSP1 | NSP2 | T0 | Tire tested | T0 | Tire tested |
| T0 | 189.23 | 189.23 | 24.26 | 24.26 | | | | |
| T1 | 63.35 | 63.35 | 24.26 | 24.26 | 47% | 55% | 17% | 10% |
| T2 | 189.23 | 189.23 | 55.26 | 55.26 | 33% | 37% | 33% | 37% |
| 10 | 63.35 | 63.35 | 24.26 | 55.26 | 21% | 0% | 54% | 100% |

The comparison between the tires T0 and T1 does not show any significant difference in the proportion of tires that have to be removed with wear less than 95%, or in the proportion of tires that attain wear greater than or equal to 95%, which remains relatively low. Thus, only changing the working reinforcement does not make it possible to maximize the use of the tread.

The comparison between the tires T0 and T2 leads to the same conclusion. Only changing the protective reinforcement, in this case the two protective plies, does not make it possible to maximize the use of the tread, either.

The comparison between the tires T0 and 10 shows that the combination both of a protective reinforcement comprising at least one ply that exhibits a particularly high force at break, in this case greater than or equal to 1300 daN·cm$^{-1}$, and comprising cords that exhibit a force at break that is likewise high, in this case greater than or equal to 3000 N, and of a working reinforcement comprising cords that are able to be penetrated to a high degree, in this case a strand comprising an unsaturated external layer of threads, makes it possible to maximize the use of the tread. Thus, even if each protective reinforcement and working reinforcement is effective independently of one another, the combination of the two reinforcements gives the tire according to the invention surprising resistance to attack.

A person skilled in the art will easily conclude from the results above that the tire 10 according to the second embodiment, in which each protective ply 42, 44 comprises "55.26" cords 58, 70, exhibits a performance greater than that of the tire according to the first embodiment.

The invention is not limited to the embodiments described above.

Tires comprising metal cords having layers comprising a single strand may also be employed.

Different reinforcing elements of the metal cords described above are also conceivable.

Working cords and/or protective cords comprising a wrapping thread are also conceivable, regardless of whether this wrapping thread is metal or textile.

The invention claimed is:

1. A tire comprising:
a tread; and
a crown reinforcement arranged radially internal to the tread, the crown reinforcement including:
(a) a protective reinforcement that includes at least one protective ply, wherein each of the at least one protective ply exhibits a force at break (Fm) greater than or equal to 1400 daN·cm$^{-1}$, wherein each of the at least one protective ply includes protective reinforcing elements, wherein each of the protective reinforcing elements exhibits a force at break (Fr) greater than or equal to 3000 N and comprises (1) an internal layer comprising a plurality of internal strands and (2) an external layer comprising a plurality of external strands, the external strands being wrapped helically around the internal layer, and wherein each internal strand comprises (i) an internal layer comprising a plurality of internal threads and (ii) an external layer comprising a plurality of external threads, and
- (b) a working reinforcement that includes at least one working ply, the working reinforcement being arranged radially internal to the protective reinforcement, wherein each of the at least one working ply includes working reinforcing elements, wherein each of the working reinforcing elements includes a working cord that includes at least one strand, wherein each of the at least one strand has a total of two layers of threads, the two layers of threads being (i) an internal layer of threads and (ii) an external layer of threads wrapped helically around the internal layer of threads, wherein the external layer of threads is unsaturated and an inter-thread distance between threads of the external layer of threads is greater than or equal to 40 μm, wherein the protective reinforcing elements make an angle at least equal to 10° with a circumferential direction of the tire, wherein the protective reinforcement is interposed radially between the tread and the working reinforcement, wherein the inter-thread distance is greater than or equal to 50 μm, wherein in the at least one strand, threads of the internal layer of threads and threads of the external layer of threads are wrapped in the same wrapping direction, wherein the at least one protective ply has a different construction from the at least one working ply, wherein in the at least one strand, the number of threads of the external layer of threads is equal to 7, wherein in the at least one strand, diameters of the threads of the internal layer of threads and of the threads of the external layer of threads are the same, wherein the at least one strand comprises a plurality of strands, and wherein the plurality of strands comprises one or more internal strands and a plurality of external strands wrapped helically around a layer comprising the one or more internal strands, a pitch of the threads of the internal layer of threads of each of the plurality of external strands being different from a pitch of the threads of the internal layer of threads of each of the one or more internal strands, and a pitch of the threads of the external layer of threads of each of the plurality of external strands being different from a pitch of the threads of the external layer of threads of each of the one or more internal strands.

2. The tire according to claim 1, wherein the force at break (Fm) of each of the at least one protective ply is greater than or equal to 1500 daN·cm$^{-1}$.

3. The tire according to claim 1, wherein the force at break (Fm) of each of the at least one protective ply is greater than or equal to 1600 daN·cm$^{-1}$.

4. The tire according to claim 1, wherein the force at break (Fr) of each of the protective reinforcing elements is greater than or equal to 3500 N.

5. The tire according to claim 1, wherein the force at break (Fr) of each of the protective reinforcing elements is greater than or equal to 4500 N.

6. The tire according to claim 1, wherein the force at break (Fr) of each of the protective reinforcing elements is greater than or equal to 5500 N.

7. The tire according to claim 1, wherein a pitch at which the protective reinforcing elements are laid ranges from 1.2 mm to 6.5 mm.

8. The tire according to claim 1, wherein, for each of the working cords of the working reinforcing elements of the at least one ply, the working cord includes at least one internal cord layer and an external cord layer, wherein:
- each of the at least one internal cord layer includes at least one internal strand,
- the external cord layer includes a plurality of external strands, with each of the external strands including at least one internal layer of threads and an external layer of threads wrapped helically around the at least one internal layer of threads, and with the external layer of threads being unsaturated.

9. The tire according to claim 1, wherein each of the at least one working ply exhibits a force at break (FmNST) greater than or equal to 2000 daN·cm$^{-1}$.

10. The tire according to claim 1, wherein each of the at least one working ply exhibits a force at break (FmNST) greater than or equal to 3500 daN·cm$^{-1}$.

11. The tire according to claim 1, wherein each of the at least one working ply exhibits a force at break (FmNST) greater than or equal to 4000 daN·cm$^{-1}$.

12. The tire according to claim 1, wherein each of the working reinforcing elements of the at least one working ply exhibits a force at break (Fr) greater than or equal to 15000 N.

13. The tire according to claim 1, wherein a pitch at which the working reinforcing elements of the at least one working ply are laid ranges from 3.5 mm to 7.5 mm.

14. The tire according to claim 1, wherein the working reinforcing elements of the at least one working ply make an angle at most equal to 60° with a circumferential direction of the tire.

15. The tire according to claim 1, wherein the crown reinforcement includes a hoop reinforcement that includes at least one hooping ply.

16. The tire according to claim 15, wherein each of the at least one hooping ply includes hoop reinforcing elements that make an angle at most equal to 10° with a circumferential direction of the tire.

17. The tire according to claim 16, wherein the hoop reinforcement is arranged radially internal to the working reinforcement.

18. The tire according to claim 15, wherein the hoop reinforcement is arranged radially internal to the working reinforcement.

19. The tire according to claim 1, wherein the protective reinforcement comprises another protective ply that has a different construction from the at least one protective ply and that is disposed radially internal with respect to the at least one protective ply.

20. The tire according to claim 1, wherein each of the protective reinforcing elements comprises a cord having an unsaturated exterior.

* * * * *